Nov. 9, 1937.   J. A. CALDWELL   2,098,614
HEAD BUMPER FOR ANIMALS
Filed June 28, 1937    2 Sheets-Sheet 1

Inventor
J. A. Caldwell

By Clarence A. O'Brien
Hyman Berman
Attorneys

Patented Nov. 9, 1937

2,098,614

UNITED STATES PATENT OFFICE 2,098,614

HEAD BUMPER FOR ANIMALS

James A. Caldwell, San Antonio, Tex.

Application June 28, 1937, Serial No. 150,846

1 Claim. (Cl. 119—143)

The present invention relates to bumpers or protectors for the heads of animals, such as rams and similar horned animals and adapted to be positioned over the forehead of the animal and attached to the horns to protect the head of the animal from injury while butting, the protector further embodying a resilient plate to prevent the animal from injuring other animals.

A further object is to provide a device of this character of simple and practical construction, strong and durable, efficient and reliable in use, relatively inexpensive to manufacture and otherwise well adapted for the purposes for which the same is intended.

Figure 1:
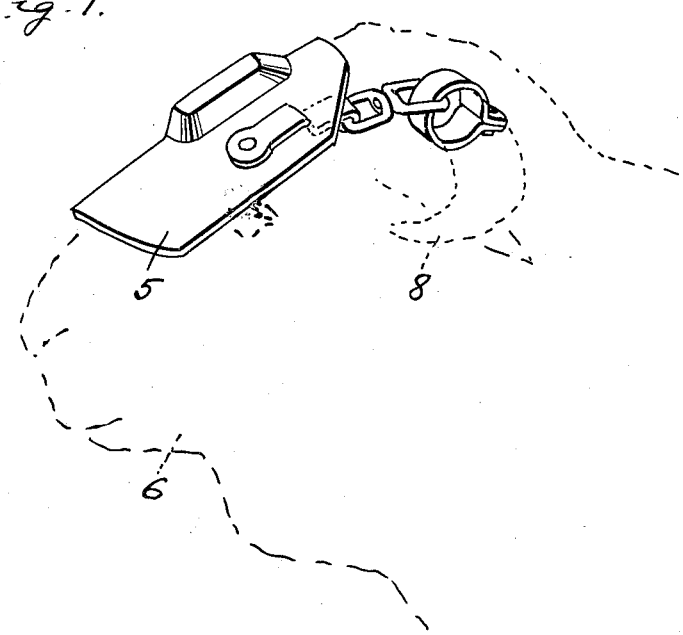
Figure 4:
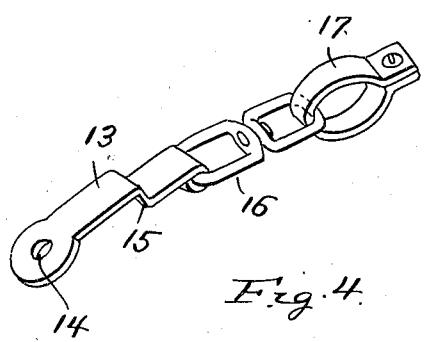
Figure 2:
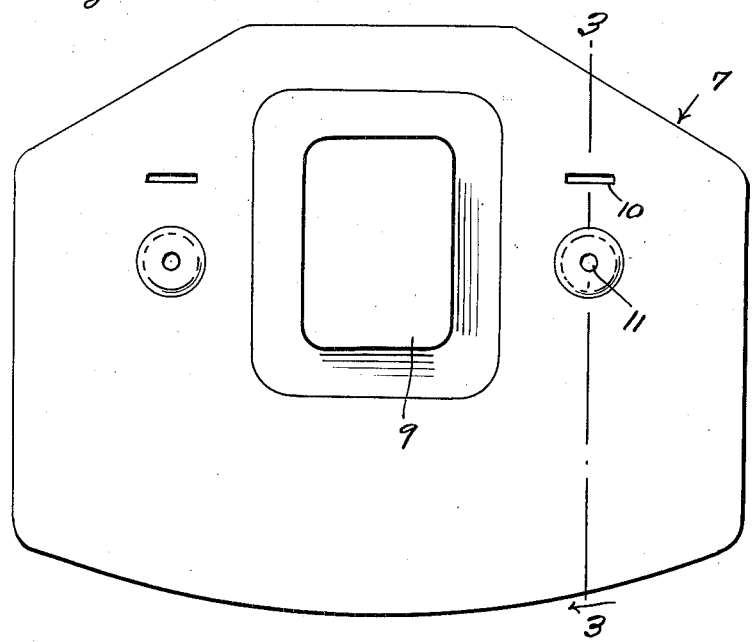
Figure 3:
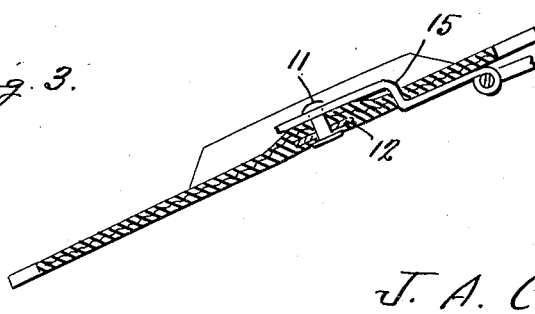

Other objects and advantages reside in the details of construction and operation as more fully hereinafter described and claimed, reference being had to the accompanying drawings forming part hereof, wherein like numerals refer to like parts throughout and in which, Figure 1 is a perspective view of the device shown in position upon the animal's head, Figure 2 is a front elevational view, Figure 3 is a sectional view taken substantially on the line 3—3 of Figure 2, and Figure 4 is a perspective view of one of the links connecting the bumper plate to the horn of the animal.

Referring now to the drawings in detail, wherein for the purpose of illustration I have disclosed a preferred embodiment of the invention, the numeral 5 designates a plate preferably constructed of molded reinforced rubber of a size suitable for positioning against the forehead of an animal as shown by dotted line in Figure 1 and designated by the numeral 6, to protect the forehead of the animal without obstructing his vision. The upper edge of the plate is tapered as shown at 7 and is of sufficient width to fit against the base of the horns 8 of the animal. The upper surface of the plate is formed with a raised rubber bumper 9 positioned substantially midway between the two vertical side edges of the plate.

At each side of the bumper 9 is arranged a horizontal slot 10 and adjacent to and immediately below each of the slots is a rivet 11 secured to the plate by a washer 12 embedded in the plate. A link 13 has one end formed with an eye 14 for receiving the rivet 11, said eye being positioned on the upper surface of the plate 5 and the link intermediate its ends is formed with an offset 15 adapted to enter the slot 10 for positioning the other end of the link below the plate 5 as will be apparent from an inspection of Figure 3 of the drawings.

The link 13 extends from the rivet 11 in an upward direction and the upper end of the link at the underside of the plate is connected to a pair of swivelly connected chain links 16, said chain links also being connected to a clamp 17 which is clamped about the horn 8 of the animal.

It will be apparent from the foregoing that when the device is placed in position on the animal as shown in Figure 1 of the drawings that the plate 5 and bumper 9 will adequately protect the forehead of the animal from injury and will also protect other animals from injury by butting by the animal to which the device is attached.

It is believed the details of construction and operation of the device will be readily understood from the foregoing without further detailed explanation.

Having thus described the invention, what I claim is:—

An animal protector comprising a resilient plate adapted to rest against and cover the forehead of the animal, a resilient bumper on the outer surface of the plate, said plate having slots one at each side of the bumper, a pair of links each having one end attached to the upper surface of the plate and provided with an offset portion positioned in one of said slots to extend the other end of the link below the plate and clamping means for attaching the links to the horns of the animal.

JAMES A. CALDWELL.